Figure 1:
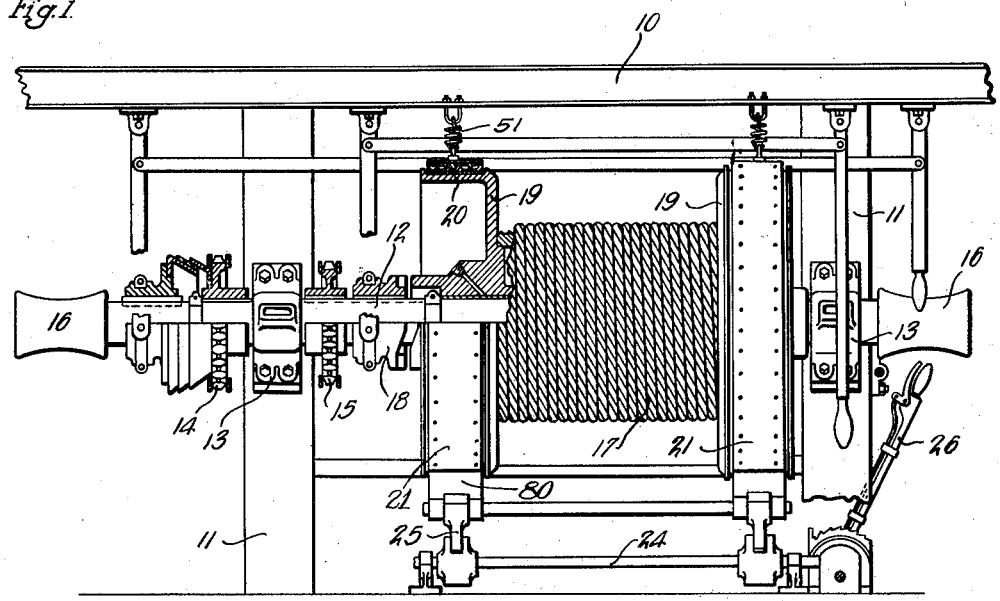

Sept. 12, 1933.  A. C. TUNISON  1,926,605
BRAKE CONSTRUCTION
Filed Nov. 24, 1930   2 Sheets-Sheet 1

Inventor
ARTHUR C. TUNISON
by
his Attorney

Sept. 12, 1933.　　　　A. C. TUNISON　　　　1,926,605
BRAKE CONSTRUCTION
Filed Nov. 24, 1930　　　2 Sheets-Sheet 2
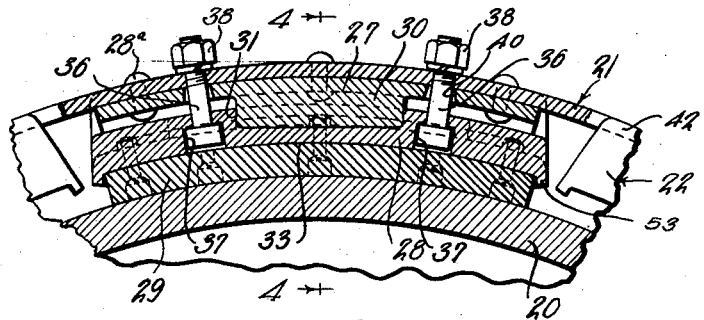
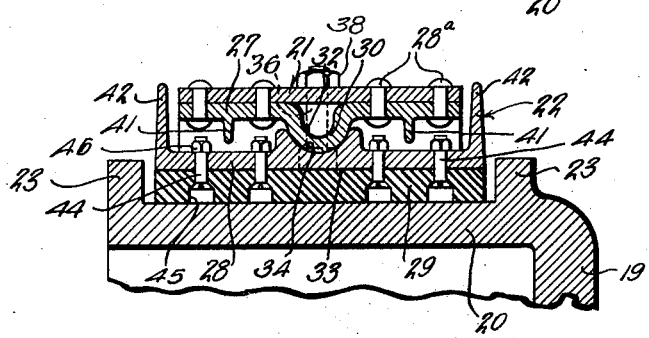
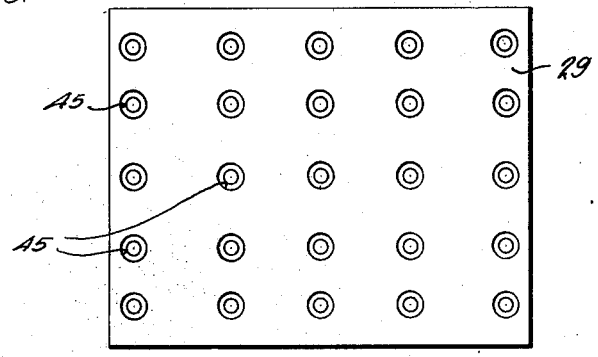
Inventor
ARTHUR C. TUNISON
By
his Attorney Patented Sept. 12, 1933

1,926,605

UNITED STATES PATENT OFFICE 1,926,605

BRAKE CONSTRUCTION

Arthur C. Tunison, Huntington Park, Calif., assignor to Baash-Ross Tool Company, Incorporated, Los Angeles, Calif., a corporation of California Application November 24, 1930
Serial No. 497,668

11 Claims. (Cl. 188—77)

This invention relates to a brake construction, and relates more particularly to a brake band and brake shoe assembly. It is a general object of the invention to provide a brake construction particularly adapted for use in connection with the brake drum of the hoisting equipment of a well drilling apparatus.

The brake means for controlling the rotation of the hoisting drums of well drilling rigs usually include open-ended brake drums or flanges at the ends of the hoisting drums and bands surrounding the flanges carrying brake lining or friction lining for engaging the flanges. The brake lining is usually continuous throughout the active portions of the bands, and sometimes interferes with the free flexing of the bands so that they do not accurately conform to the curvature of the flange or drum. Further, during use, the brake drums or flanges become heated and expand. The drums or flanges are usually open-ended, being connected with the winding drum along their inner edges; and, when they become heated, their peripheral braking surfaces become conical and inclined relative to their axes of rotation, so that the braking pressures are unequally distributed and the lining worn unevenly.

It is an object of the invention to provide a brake band and brake shoe construction in which the brake band is free to flex evenly when operated and by means of which an even, effective braking action may be obtained.

It is a general object of the invention to provide a brake construction that embodies a band for surrounding a brake drum, and a plurality of shoes mounted on the inner side of the band that are free to rock or tilt so that their braking surfaces may effectively conform with the configuration of the drum.

It is another object of the invention to provide a brake band and brake shoe construction of the character mentioned in which the lining carried by the shoes may be easily and quickly replaced when worn.

It is a further object of the invention to provide a plurality of like units or shoes for mounting on a brake band that are particularly simple and inexpensive of manufacture and which may be employed in connection with the brake means of the hoisting or winding drums in general use.

Another object of the invention is to provide a brake construction of the character mentioned in which the brake shoes are mounted to provide spaces for the radiation of heat and to permit the escape of dirt and foreign matter from between the brake shoes.

Figure 2:
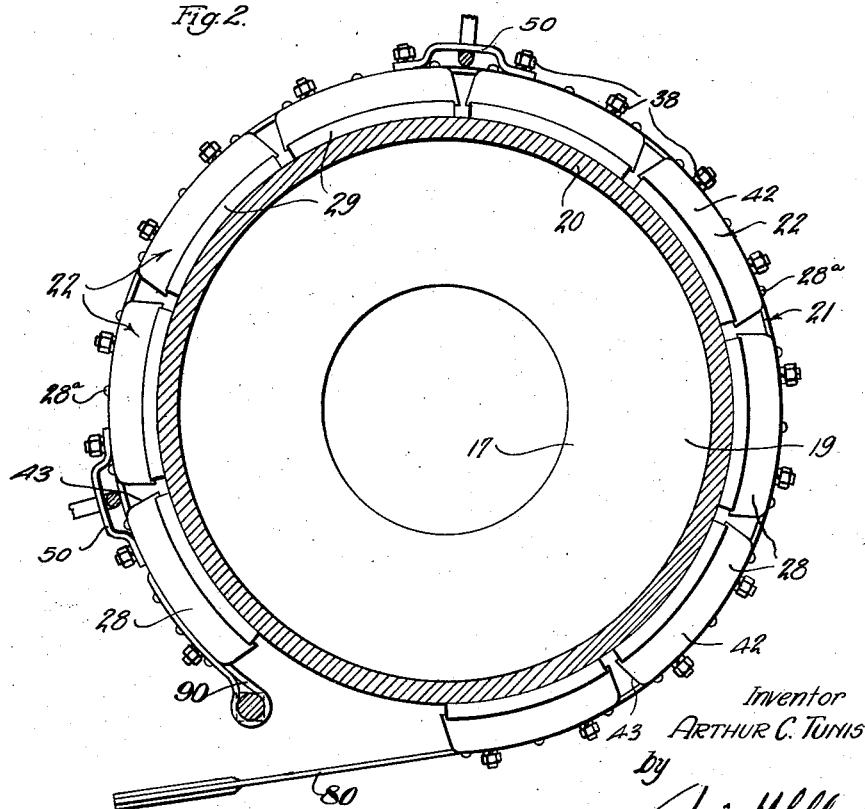

Other objects and features of my invention will be best and more fully understood from the following detailed description of a typical form and application of the invention, throughout which description reference is had to the accompanying drawings, in which:

Fig. 1 is a front elevation of the drawworks of a typical well drilling apparatus, showing the brake construction embodied therein and illustrating a portion of one of the brake drums in cross section. Fig. 2 is an enlarged end view of the brake band and shoe construction provided by the present invention. Fig. 3 is an enlarged longitudinal detailed sectional view of one of the units or shoes. Fig. 4 is a transverse detailed sectional view, taken as indicated by line 4—4 on Fig. 3, and Fig. 5 is an enlarged elevated view of the section of lining to be used on one of the brake shoes.

The brake means or construction provided by the present invention is capable of embodiment in forms for use in various classes of mechanisms. Throughout the following detailed disclosure, the invention will be described in connection with the winding or hoisting drum of a well drilling apparatus, it being understood that the invention is not to be considered as restricted to the particular embodiment or application about to be described.

The portion of the well drilling rig illustrated in Fig. 1 of the drawings is a part of what is commonly termed the "draw works" and includes a girth and head board 10, uprights 11 supporting the head board 10, a horizontal shaft 12 carried by bearings 13 on the sides of the uprights 11, sprockets 14 and 15 on the shaft, catheads 16 on opposite ends of the shaft, a winding drum 17 on the shaft, a clutch 18 for rotatably connecting the winding drum 17 with the shaft 12, and various other parts common to mechanisms of this character. The drum 17 is provided at its opposite ends with radial end plates or flanges 19, terminating in axial outwardly projecting brake flanges 20. The end flanges 19 and 20 may be integral and constitute brake drums on the opposite ends of the winding drum 17. Bands 21 surround the drums or flanges 20 and are adapted to carry the brake units or shoes provided by the present invention. It will be apparent that the brake means for co-operating with the two brake flanges 20 may be of the same construction. I will proceed with a detailed description of the assembly of one of the bands 21 and the brake shoes for co-operating with one of the flanges 20, it being apparent that the description may apply to both or either of the brake assemblies.

The construction provided by the present invention includes, generally, a band 21 surrounding a flange or drum 20, and a plurality of like units or shoes 22 for engaging or co-operating with the flange 20.

The band 21 is a flexible member surrounding the flange 20 and may be similar, generally, to the type of brake band in general use on hoisting equipment. In the particular construction illustrated in the drawings, spaced annular guide ribs 23 are provided at the inner and outer edges of the brake flange 20, and the band 21 surrounds the flange between the ribs 23. One end of the band 21 is adapted to be attached or anchored stationarily to the derrick construction, while the other end is adapted to be connected with a suitable operating means. In the particular case illustrated, a horizontal shaft 24 is arranged adjacent the floor of the derrick and extends between the lower ends or active end 30 of the two bands 21. The movable end of the brake bands 21 may be attached to cranks or levers 25 mounted on the shaft 24. The dead or stationary ends 90 of the bands 21 may be fixed or anchored in any suitable manner. The shaft 24 is adapted to be operated or turned by means of a suitable hand lever 26 for operating the two brake bands 21. It is to be understood that the invention is not particularly concerned with the means for operating the brake bands, and that the construction illustrated in the drawings is not to be taken as restricting the invention.

The units 22 are mounted on the inner side of the brake band 21 and are preferably alike. The units 22 are circumferentially spaced and are preferably symmetrically or equally spaced around the brake band. Each of the like units 22 includes a rocker plate 27 mounted on the inner side of the band 21, a shoe 28 carried on the plate 27, and brake lining or friction lining 29 on the shoe 28 for frictionally engaging or co-operating with the flange 20.

The rocker plates 27 are integral members permanently attached to or mounted on the inner side of the brake band 21. The plates 27 may be of the same width as the band 21, and may be elongated or rectangular, as illustrated throughout the drawings. In accordance with the invention, the plates 27 are longitudinally curved throughout their lengths to effectively seat on the inner side of the band 21. In the particular case illustrated, the rocker plates 27 are attached to the brake band 21 by means of a plurality of spaced rivets 28ª. The plates 27 are provided to support the shoes 22 so that they may rock or tilt about axes tangential to a circle concentric to the axis of rotation of the flange 20. A bearing ridge or projection 30 is provided on the inner side of each plate 27 for supporting a shoe 22. The bearing projections 30 are elongated and extend longitudinally or axially of the plates 27. The bearing ridges 30 are centrally spaced between the side edges of the rocker plates and brake band. In the preferred form of the invention, the elongated bearing projections 30 are considerably shorter than the plates 27 and are centrally located between the opposite ends of the plates. The ends 31 of the bearing ridges or projections 30 are preferably flat and parallel. The exteriors of the projections 30 are curved so that the shoes 28 are adapted to tilt or rock about axes tangential to a circle concentric to the axis of the mechanism. The exteriors of the projections 30 are smooth and regular and are curved throughout their length. In practice, the bearing projections 30 may be substantially semi-circular in cross section, as illustrated in Fig. 4 of the drawings. In practice, where the plates 27 are formed of sheet metal or cast steel, they may be bent or distorted to provide the curved or rounded bearing projections 30, so that an elongated groove 32 is provided on the outer side of each plate within the bearing projection.

The shoes 28 are provided to carry the lining 29 for engaging the brake flange 20, and are mounted so as to be free to rock or tilt on the bearing ridges 30. The shoes 28 may be substantially rectangular plate-like members, and are curved throughout their lengths to carry the lining 29 so that it evenly engages the periphery of the flange 20. The inner sides 33 of the shoes 28 are preferably smooth and regular to effectively and evenly support the lining 29. Longitudinal troughs or bearing seats 34 are provided on the outer sides of the shoes 28 for carrying the bearing projections 30, so that the shoes 28 are free to rock on the projections. The walls of the seats 34 are curved and finished to receive the rounded or curved projections 30. The seats 34 are provided with end walls 35 for receiving the opposite ends 31 of the projections to prevent longitudinal or circumferential shifting of the shoes 28.

In accordance with the invention, the shoes 28 are loosely attached to or connected with the band 21. Bolts 36 pass through registering openings in the shoes, plates, and the band 21 at opposite ends of the projections 30. The heads of the bolts 36 may be countersunk in sockets 37 in the inner side of the shoes 28, and the threaded ends of the bolts may project outwardly from the exterior of the band 21. Nuts 38 may be threaded on the projecting ends of the bolts 36 to retain the brake shoes in position. The openings 40 in the rocker plates 27, for passing the bolts 36, are proportioned to freely pass the bolts and may have inwardly diverging walls so that the bolts will not bind in them and prevent tilting of the brake shoes.

Stop means may be provided for limiting the project inwardly from the inner sides of the rocking or tilting of the shoes 28. Stops 41 plates 27. The stops 41 may be spaced from the opposite sides of the bearing projections 30, and are adapted to engage the inner sides of the shoes 28 to limit their rocking or tilting movement. The stops 41 may be formed integral with the rocker plates 47. Protective flanges 42 may be provided along the side edges of the shoes 28. The flanges 42 may extend along the shoes from one end to the other and project radially outward. In the particular case illustrated, the flanges 42 project outwardly to points at or beyond the band 21. The ends 43 of the protective edge flanges 42 are tapered outwardly as clearly illustrated in the drawings. The flanges 42 are provided to prevent the entrance of foreign material between the brake shoes 28 and the rocker plates 27 and operate to otherwise protect the assembly.

The lining 29 is mounted on the inner sides of the brake shoes 22 for engaging or braking against the periphery of the flange 20. In accordance with the invention, the lining 29 may be formed of any suitable type of brake or friction lining material. In the preferred form of the invention, there is a single integral piece of lining 29 provided on the inner side of each shoe 28. The bodies of lining 29 may extend between the side edges of the shoes 28, and may be substantially rectangular as illustrated in Fig. 5 of the drawings. In accordance with the broader principles of the invention, the lining 29 may be attached to the brake shoes 28 in any suitable manner; however, it is preferred to attach the lining to the shoes by means of screws or bolts 44, so that it may be easily and quickly removed from the shoes for replacement, etc. The slotted heads of the screws 44 may be countersunk in sockets 45 in the inner sides of the lining 29, and the threaded ends of the screws or bolts may project from the outer sides of the shoes 28. Nuts 46 may be threaded on the projecting end parts of the bolts 44 to clamp the lining 29 onto the brake shoes 28. Inwardly projecting flanges 53 are provided at the projecting ends of the shoes 28 to prevent the lining 29 from shifting circumferentially. The flanges 53 project inwardly at the ends of the sections of lining 29 and act to positively prevent shifting of the lining 29.

Means may be provided for flexing the band 21 outwardly upon release of the brake and for equalizing the inward pressures or braking pressures during operation. In the construction illustrated, two spaced brackets 50 are mounted on the exterior of the band 21. The brackets 50 may be secured to the band 21 by means of the bolts 36 and nuts 38 of two adjoining units 22. Extensile springs 51 may be attached to the brackets 50 and suitable spaced parts at the draw works. The springs 51 may be such that they normally exert an outward strain or pull on the band 21.

It is believed that the utility and practicability of the brake band and shoe construction provided by the present invention will be readily apparent from the foregoing detailed description. Upon the band 21 being tightened around the flange 20, the lining 29 is brought into braking engagement with the exterior or periphery of the flange. As the lining 29 is carried by a plurality of spaced units, the band 21 is free to equally flex throughout its length. Accordingly, the braking pressures are evenly distributed around the flange 20. In the event that the brake drum or flange 20 becomes heated and its outer part becomes expanded to a greater extent than its inner part, the several shoes 28 are free to rock or tilt on the projections 20 upon the lining 29 being brought into engagement with the flange so that the braking pressures are even across the several brake shoes. The shoes 28 may be easily and quickly removed from the assembly to replace the lining 29 by removing the bolts 36. The shoes 28 are spaced from the plates and band 21 so that heat generated during operation is quickly radiated and dissipated. The brake shoe units 22 are particularly simple and inexpensive of manufacture and do not include any delicate or complicated parts.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A device for use in connection with a brake drum which includes, a band around the drum, a shoe for engaging the drum, and means mounting the shoe on the inner side of the band so that it is free to pivot about an axis transverse of the axis of the drum and tangential to a circle concentric with the drum, said means including a seat in the shoe, and a bearing projection on the inner side of the band co-operating with the seat in the shoe.

2. A brake means for use in connection with a brake drum which includes a band around the drum, two members, one a plate on the inner side of the band, the other a shoe for engaging the drum, and means for mounting the shoe on the plate so that it is oscillatable about an axis transverse of the axis of the drum and tangential to a circle concentric with the drum, including a seat on one of the members, and a bearing part on the other member to co-operate with the seat.

3. A brake means for use in connection with a brake drum which includes two members, one a band around the drum, the other a shoe for engaging the drum, and means for mounting the shoe on the band so that it is oscillatable about an axis transverse of the axis of the drum and tangential to a circle concentric to the axis of the drum, including a seat on one of the members extending circumferentially of the band, and an elongated bearing part on the other member co-operating with the seat.

4. A brake means for use in connection with a brake drum which includes, a band around the drum, two members, one a plate on the inner side of the band, the other a shoe for engaging the drum, and means for mounting the shoe on the plate so that it may pivot about an axis tangential to a circle concentric to the axis of the drum, including a seat on one member and a bearing part on the other member to co-operate with the seat, and means loosely connecting the shoe to the plate.

5. A brake means for use in connection with a brake drum which includes, a band around the drum, a shoe for engaging the drum, and means for mounting the shoe on the band so that it may pivot about an axis transverse of the axis of the drum and tangential to a circle concentric to the axis of the drum, including a seat in the shoe and a bearing part on the band to co-operate with the seat, and means loosely and removably connecting the shoe to the band.

6. A brake means for use in connection with a brake drum which includes, two members, one a band around the drum, the other a shoe for engaging the drum, and means for mounting the shoe on the band so that it may pivot about an axis transverse of the axis of the drum and tangential to a circle concentric to the axis of the drum, including a seat on one member and a bearing part on the other member to co-operate with the seat, and stop means for limiting the movement of the shoe.

7. A brake means for use in connection with a brake drum which includes, two members, one a band around the drum, the other a shoe for engaging the drum, and means for mounting the shoe on the band so that it may pivot about an axis tangential to a circle concentric to the axis of the drum, including a seat on one member and a bearing part on the other member to co-operate with the seat, and a stop on one member adapted to engage the other to limit the pivotal movement of the shoe.

8. A brake means for use in connection with a brake drum which includes, a band around the drum, two members, one a plate on the inner side of the band, the other a shoe for engaging the drum, and means for mounting the shoe on the plate so that it may pivot about an axis transverse of the axis of the drum and tangential to a circle concentric to the axis of the drum, including a seat on one member and a bearing part on the other member to co-operate with the seat, and means loosely connecting the shoe to the plate, including a bolt carried by the shoe and freely passing through an opening in the plate.

9. Brake means for use in connection with a drum including, a flexible band around the drum, and a plurality of units on the inner side of the band, each unit including two members, one a plate mounted on the band, the other a shoe, and means mounting the shoe on the band so that it is free to pivot about an axis tangential to a circle concentric with the drum, the pivotal axes of the shoes of the several units being tangential to a common circle.

10. Brake means for use in connection with a drum, including a flexible band around the drum, and a plurality of units on the inner side of the band, each unit including two members, one a plate mounted on the band, the other a shoe, lining on the shoe for engaging the drum, and means mounting the shoe on the band so that it is free to pivot about an axis tangential to a circle concentric with the drum, the pivotal axes of the shoes of the several units being tangential to a common circle.

11. A brake means for use in connection with a brake drum which includes, a band around the drum, two members, one a plate on the inner side of the band, the other a shoe for engaging the drum, means for mounting the shoe on the plate so that it may pivot about an axis tangential to a circle concentric with the drum, and flanges on one of the members for preventing the entrance of foreign material between the members.

ARTHUR C. TUNISON.